United States Patent
Vivona

[19]

[11] Patent Number: 5,960,407
[45] Date of Patent: Sep. 28, 1999

[54] AUTOMATED MARKET PRICE ANALYSIS SYSTEM

[76] Inventor: Robert G. Vivona, 74 Sulky La., Glastonbury, Conn. 06033

[21] Appl. No.: 08/728,247

[22] Filed: Oct. 8, 1996

[51] Int. Cl.$^6$ ............................ G06F 15/18; G06F 17/40; G06F 7/52; G06F 17/60
[52] U.S. Cl. .............................. 705/10; 705/400; 705/35; 705/39; 705/1; 705/26; 705/27; 395/701; 395/200.33; 395/200.57; 395/200.56; 395/139
[58] Field of Search ................................. 705/400, 10, 35, 705/1, 39, 26, 27; 395/701, 200.33, 200.57, 139, 200.59, 419, 329; 711/144; 345/327; 371/21.1; 455/4.2; 360/72.2; 707/526

[56] References Cited

U.S. PATENT DOCUMENTS

| | | | |
|---|---|---|---|
| 5,283,731 | 2/1994 | Lalonde et al. | 705/1 |
| 5,377,095 | 12/1994 | Maeda et al. | 705/10 |
| 5,414,621 | 5/1995 | Hough | 705/10 |
| 5,452,468 | 9/1995 | Peterson | 395/800 |
| 5,546,564 | 8/1996 | Horie | 705/400 X |
| 5,664,126 | 9/1997 | Hirakawa et al. | 345/329 |
| 5,680,305 | 10/1997 | Apgar, IV | 705/10 |
| 5,724,521 | 3/1998 | Dedrick | 705/10 X |
| 5,745,882 | 4/1998 | Bixler et al. | 705/26 |
| 5,752,238 | 5/1998 | Dedrick | 705/10 |
| 5,754,938 | 5/1998 | Herz et al. | 455/4.2 |
| 5,799,284 | 8/1998 | Bourquin | 705/26 |
| 5,809,035 | 9/1998 | Sikdar et al. | 371/21.1 |
| 5,819,092 | 10/1998 | Ferguson et al. | 395/701 |
| 5,832,432 | 11/1998 | Trader et al. | 704/260 |
| 5,835,087 | 11/1998 | Hez et al. | 345/327 |
| 5,835,923 | 11/1998 | Shibata et al. | 707/526 |
| 5,848,396 | 12/1998 | Gerace | 705/10 |

*Primary Examiner*—Allen R. MacDonald
*Assistant Examiner*—Pedro R. Kanof
*Attorney, Agent, or Firm*—McCormick, Paulding & Huber LLP

[57] ABSTRACT

A system for estimating price characteristics of a product from classified advertisements comprising a plurality of textual characters, comprises a relevant classified advertisement database, an attribute filter, a filtered classified advertisement database, a price analyzer and a graphing module. The relevant classified advertisement database stores relevant classified advertisement signals indicative of a subset of the classified advertisements which are directed to the product. The attribute filter receives the relevant classified advertisement signals, and generates in dependence thereupon numeric value signals indicative of prescribed subsets of characters in the subset of the classified advertisements. Each prescribed subset of characters represents a numeric value. The filtered classified advertisement database receives the numeric value signals and stores the numeric value signals. The price analyzer receives the numeric value signals from the filtered classified advertisement database, and determines the price characteristics of the product in dependence on the numeric value signals. The price analyzer also generates price characteristic signals in accordance with the price characteristics of the product. The graphing module receives the price characteristic signals and generates graphical display signals which present the price characteristics of the product in graphic form.

17 Claims, 4 Drawing Sheets

FIG. 7

AUTOMATED MARKET PRICE ANALYSIS SYSTEM

FIELD OF THE INVENTION

The present invention relates to systems for estimating market prices and market price characteristics of goods and services.

BACKGROUND OF THE INVENTION

Both buyers and sellers of a product, such as a good or service, in a specific market benefit from determining the need of the product. By having quantitative information on the need of a product, a buyer knows how much he should be willing to spend to acquire the product. Similarly, having quantitative information on the need of a product allows a seller to know how much he should be willing to accept in exchange for the product. For example, both an employer and a potential employee need to know the worth of the employee's skills. The employer must know the optimum salary amount the employee should receive. An employer that offers an employee a salary that is too high will lose money that would have been better spent elsewhere. On the other hand, an employer that offers a salary that is too low will most likely not be able to attract and retain acceptable candidates for a job position, since talented workers will go to competing businesses instead.

A survey is a common method of obtaining relevant quantitative information such as quantities, prices, revenue, costs, income and expenditure. Surveys acquire information by polling survey participants such as individuals, households, businesses or a combination thereof. Survey participants answer questions, and the answers of the participants are collected and used to estimate characteristics of a larger population.

In general, surveys which acquire information on labor markets are generated by five sources: the government, professional or trade associations, research companies, recruitment companies and published sources.

The government, specifically the Bureau of Labor Statistics (BLS), polls a number of firms from a list of state unemployment insurance reports to create an Employee Benefits Survey. Professional or trade associations may include associations of universities in a region, associations of businesses in a region, associations of businesses employing particular types of labor and associations of professionals in a particular field. These associations take a survey of their members, and may include survey information on the members themselves or their employees. Typically, a membership fee and various survey information fees drive the cost of the association's survey. Research companies, in particular human resource consulting firms, compile survey information and sell reports containing subsets of the survey information. Recruitment companies present salary information obtained from surveys of client corporations in order to recruit job candidates. Published sources, such as printed magazines, newsletters, periodicals and the Internet, may either survey subscribers or survey the results of research firms and consulting firms.

In general, conventional methods of obtaining quantitative information on the need of a product suffer from several shortcomings. For example, the BLS Employee Benefits Survey covers extremely broad classifications of labor across the set of industrial classifications of businesses, and is not intended to be used to assess the markets for specific types of jobs. The surveys of professional or trade associations measure a restricted segment of the market, thereby skewing the results away from true market values. Research companies do not typically collect all relevant information in one report. Recruitment companies provide information which is intended to lure candidates into certain job placement services. Furthermore, the salary information provided by recruitment companies typically represents an association of businesses rather than the relevant market as a whole. Finally, periodicals usually present information which is too broad to be of use in determining salary goals.

There is also no sophisticated analysis of the information obtained by surveys. For example, most salary survey reports simply present salary ranges of the survey participants, yielding only a minimum salary and a maximum salary for a group of survey participants. From this information alone, it is extremely difficult to estimate the salary of any one employee or potential employee, and it is likewise difficult to estimate the likelihood that the salary estimate of an employee is correct.

Another drawback is the large expense involved in performing a survey. Creating, distributing and collecting surveys is a time consuming process, and the accuracy of information submitted by survey participant,, is critical. A survey questionnaire must first be developed, which can be difficult because each question must be worded as not to favor a particular response. For example, a first question "How long have you been unable to find a job?" in theory elicits the same information as a second question "How long have you been unemployed?". However, the survey participant may interpret an answer to the first question as an admittance of a personal inability that many unemployed people would reject. A survey is also expensive since a highly skilled survey practitioner is required to obtain reliable and useful information from survey participants. For example, voice inflection of the survey practitioner and presentation by the survey practitioner can unintentionally signal to the survey participant a desired response. Creating a list of survey participants, comprising names, phone numbers and addresses of appropriate participants who are randomly selected from the population or who represent desirable demographics, is also an expensive and time-consuming task. The collected survey information, which is generally hand-written, must then be transferred to a data base.

Still another drawback of surveys is the type of information a survey obtains. Salary surveys, for example, present the current salaries of employees. Surveys do not provide competitive salary amounts which reflect current market prices. Surveys provide information best suited for comparative evaluation of corporate employee pay scales, rather than salary information on current job markets. Furthermore, salary surveys are typically overly broad and thus not of much use in determining salary goals for a particular individual with a specific set of skills and a particular amount of experience.

Conventional salary estimation systems are typically designed to aid human resource departments determine competitive salary grade structures for each type of job within an organization's job hierarchy. Such estimation systems are geared towards the internal cost analysis and decision making of a firm. Employee survey statistics are used to assess and ensure the competitiveness of the cost and compensation structure of the firm. Average salaries, distribution quartiles and distribution ranges of salaries are used for comparative positioning of the salary grades, for setting a base salary level, and for determining high and low salary levels.

Unfortunately, salary grades are not equivalent to years of experience in a job, nor are salary grades defined in terms of a quantitatively measurable job property or characteristic. Since salary grades are not dependent on numerical quantity, they can not be statistically ascertained.

It would be advantageous to provide a system for generating accurate market price estimations for a product which is not as expensive, as conventional methods for generating market price estimations. It would be further advantageous to provide a system for generating accurate market price estimations for a product which has a numeric, variable quality attribute.

SUMMARY OF THE INVENTION

It is an object of the present invention to provide a system for estimating price characteristics of a product which is not as expensive as conventional methods.

It is another object of the present invention to provide a system for generating accurate price characteristics of a product which has a numeric, variable quality attribute.

In accordance with the present invention, a system for estimating price characteristics of a product from classified advertisements comprises a plurality of textual characters, a relevant classified advertisement database, an attribute filter, a filtered classified advertisement database, a price analyzer and a graphing module. The relevant classified advertisement database stores relevant classified advertisement signals indicative of a subset of the classified advertisements which are directed to the product. The attribute filter receives the relevant classified advertisement signals, and generates in dependence thereupon numeric value signals indicative of prescribed subsets of characters in the subset of the classified advertisements. Each prescribed subset of characters represents a numeric value. The filtered classified advertisement database receives the numeric value signals and stores the numeric value signals. The price analyzer receives the numeric value signals from the filtered classified advertisement database, and determines the price characteristics of the product in dependence on the numeric value signals. The price analyzer also generates price characteristic signals in accordance with the price characteristics of the product. The graphing module receives the price characteristic signals and generates graphical display signals which present the price characteristics of the product.

DESCRIPTION OF PREFERRED EMBODIMENT

The following is a short glossary of terms used herein:
Classified Advertisement
An advertisement by either a buyer or seller of a product.

Key Word Categories
A classification that encompasses a plurality of nominal key words.
Market
A set of buyers and sellers of a product.
Nominal Key Words
A word or set of words which identifies or "names" a desired product.
Numerical Key Word
Words or groups of words which are associated with a numeric value word or phrase.
Price Characteristics
Information on the pricing of a product, such as the average price of the product, the variation and standard deviation of the price of the product, and the way in which the price of the product varies with variations in one or more quality attributes of the product.
Product
A good or service to be sold or bought, and which is typically advertised in a classified advertisement.
Quality Attribute
A product attribute that differentiates items of the same product from one another.
Source
A publication, typically a newspaper, which contains classified advertisements.

In general, the present invention determines quantitative information on the need of a product from a sample of classified want-ads. Deriving information from a classified advertisement is quicker than deriving such information from a survey, which typically takes between five and ten minutes for each survey participant to answer. The present invention statistically estimates a market's price characteristics from the want-ads and presents the price characteristics in graphical and textual form to a user. The present invention will be described with reference to an embodiment for the estimation of labor prices. However, it will be understood by those skilled in the art that the present invention may be used to estimate the prices of a variety of products identified by classified advertisements, such as cars and real estate.

The present invention is preferably implemented as a computing platform, such as a conventional Pentium-based computer, which operates in accordance with software provided on a storage medium, such as a conventional hard drive, to perform process steps as described herein. The computing platform includes other conventional computer peripheral elements necessary for its functionality, such as a computer monitor and a keyboard. As is known in the art, a single conventional computer may perform steps in accordance with a plurality of software modules. In the preferred embodiment, the various modules described herein execute on a single computer unless otherwise noted.

Furthermore, the hereinbelow-described databases are typically implemented by commercially available software packages, such as FileMaker Pro, by Claris, Inc.

The computing platform receives signals indicative of classified advertisements in a source, and transforms those signals into signals indicative of price characteristics of different products described by the classified advertisements. The signals indicative of price characteristics are typically presented in graphical form to a user, such as a display on a video monitor or a printed display from a computer printer. The computing platform therefore physically transforms the signals indicative of classified advertisements.

The classified advertisements are typically printed text, and the signals indicative of the classified advertisements are "measurements" of the printed text. The signals indicative of the classified advertisements are therefore signals corresponding to the physical printed text, and are typically generated by scanning the text through a conventional computer scanner with optical character recognition (OCR) software, or data entry into a signal storage medium such as a computer hard drive.

By storing an executable price-estimation computer program in accordance with the present invention in a general purpose digital computer's memory, and executing the stored program, the stored program imparts price estimation functionality to the general purpose digital computer by changing the state of the computer's arithmetic logic unit when program instructions of the price estimation program are executed.

The present invention has real world applicability in estimating the market value of a product, such as the salary amount warranted by a potential employee with a certain set of skills and a certain amount of experience. This estimation is valuable to companies seeking to make competitive salary offers to potential employees. The estimation is also valuable to potential employees attempting to determine the worth of their skills and experience to a potential employer.

Classified want-ads are a more effective way to measure the price characteristics of a market than a survey. Salary surveys, for example, present the current salaries of employees, while classified want-ads present an initial negotiating amount which is intended to attract a job candidate. Classified want-ads do not measure a current expenditure of a business, but instead more closely reflect the true market value of a product or service, such as labor. Furthermore, classified advertisements are a decentralized form of information presentation wherein a number of individuals independently provide information. Surveys, on the other hand, require centralized creation of a survey and costs incurred by the survey taking entity to poll individuals.

Figure 1:
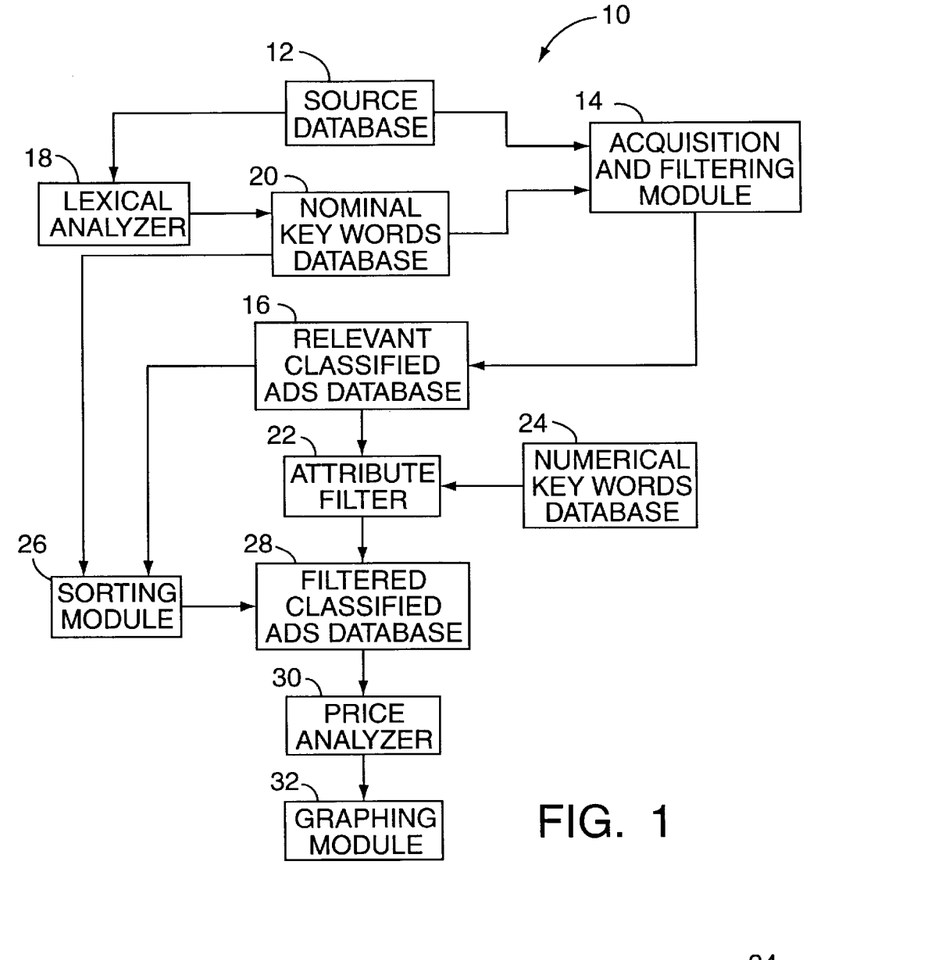
FIG. 1 is a schematic illustration of a price estimation system provided in accordance with the present invention.

FIG. 1 is a schematic illustration of a price estimation system 10 provided in accordance with the present invention. A Source Database 12 contains signals indicative of classified advertisements which are published in a source. The classified advertisements identify and define a market of buyers and sellers. The market comprises parties who provide the advertisements and parties who read or respond to the advertisements. A source of classified advertisements, such as a particular newspaper or trade publication, identifies characteristics of the market. For example, classified advertisements in a given newspaper are representative of a regional labor market. The New York Times is a source which represents a labor market with a broader scope than most other newspapers. Classified advertisements in publications of professional associations represent a labor market of certain types of professionals: i.e., the American Economic Association identifies an academic labor market for economists.

Clearly, the source selected must be representative of a desired market. Certain undesirable sources seek to strategically improve the bargaining position of buyers or sellers by listing only advertisements of certain parties. Such an exclusive source tends to restrict market access and skew price characteristics away from true market values. Another type of undesirable source is one with a small number of buyers or sellers. Such a source does not have an adequate sample size for significant statistical results, and excludes segments of demand or supply that exist in the marketplace. Often, a source with a large number of classified advertisements will not constitute an acceptable source because the number of classified advertisements directed to each type of product is too small, generally less than thirty five advertisements.

A source may be selected by simply choosing a newspaper that purports to represent a desired geographic region or subclass of the population. Alternatively, a source, such as a World Wide Web (WWW) page, may be selected simply because it provides a large number of unbiased classified advertisements. A source such as the New York Times contains a large number of classified advertisements which are not duplicated in any other single source. Accordingly, New York Times classified advertisements may be used as a source for determining the price characteristics of several types of products, such as computer-related services. Though multiple newspapers may be selected to form a source, it is preferable to use a single newspaper as a source for simplicity and to eliminate redundant classified advertisements. In the preferred embodiment, the Source Database stores signals indicative of at least six months of New York Times Sunday Employment Sections classified advertisements, comprising approximately 1,300 classified advertisements.

As stated hereinabove, a set of classified advertisements in a source typically present the demand and supply of many products in a market. For example, employment classified advertisements in a source provide initial bargaining positions of demand for various types of labor, while real estate classified advertisements in the same source provide housing supply information. Once a given product is identified, competing bids for the product may be found in a prescribed subset of the classified advertisements in a source. Price characteristics of the product may then be determined from the prescribed subset.

An Acquisition and Filtering Module 14 selects signals indicative of a subset of the classified advertisements from the Source Database and stores the signals indicative of the subset of classified advertisements in a Relevant Classified Advertisements Database 16. The signals indicative of the subset of the classified advertisements are indicative of those classified advertisements which are relevant, i.e. directed to a desired product or class of products. A classified advertisement is considered relevant, and therefore "selected", if it contains prescribed nominal key words, i.e. prescribed combinations of alphanumeric characters.

A nominal key word is a word or set of words which identifies or "names" a desired product. For example, if the desired product is the services of a C language computer programmer, appropriate nominal key words would be "C programmer" and "C software engineer". A word which serves as a nominal key word for one product does not necessarily serve as a nominal key word for another product. For example, the phrase "C programmer" is an appropriate nominal key word if the product is a C language computer programmer. However, the phrase "C programmer" is not an appropriate nominal key word if the product is a sports car or a raised ranch home.

A set of nominal key words which identify a specified product may be derived from the source of classified advertisements. A Lexical Analyzer 18 receives, from the Source Database 12, signals which are indicative of the classified advertisements. The Lexical Analyzer receives from the Source Database 12 signals indicative of words which are included in more than one classified advertisement. Word or sets of words which are repeated are considered nominal key words, so the Lexical Analyzer 18 generates nominal key word signals indicative of the repeated words or sets of words. The Lexical Analyzer 18 stores the nominal key word signals in a Nominal Key Words Database 20. In the preferred embodiment, the signals indicative of classified advertisements are ASCII signals, and the Lexical Analyzer 18 operates in accordance with conventional pattern-matching methods to match ASCII signals of repeated words.

The nominal key words, taken individually or in groups, define specific products and non-numerical attributes of products. For example, a nominal key word in a classified advertisement, such as "Unix", may distinguish a product "Unix C programmer" identified by that classified advertisement from a product "non-Unix C Programmer" identified by a classified advertisement which does not include the nominal key word "Unix". Nominal key words in an automobile classified advertisement may specify a manufacturer, model name, and engine size of a product. As is described hereinbelow, nominal key words are used in determining statistical differences between the price characteristics of different products.

In the preferred embodiment, the Acquisition and Filtering Module 14 and the Lexical Analyzer 18 are each a software system running on a computing platform. However, in another embodiment, the Acquisition and Filtering Module may be implemented as a human analyst who selects the relevant classified advertisements based on a prescribed set of nominal key words. In still other embodiments, the Lexical Analyzer may be implemented as a human analyst who determines a prescribed set of nominal key words based on classified advertisements in the source, his own expert knowledge, or a combination of both. The Nominal Key Words Database 20 is then programmed to store nominal key word signals indicative of the expert-determined nominal key words.

Nominal key words as described hereinabove are "naming", or nominal, terms that identify a product but not necessarily the quality or quantity of the product. For example, the nominal key word "C programmer" does not identify how many years of experience are desirable for the programmer to have. Words that identify salary amount, years of experience, price, model year, mileage, and square feet are all examples of quality or quantity.

Two or more items of the same type of product may be differentiated by quality attributes of the product in certain areas. For example, age is a quality attribute for an automobile, square feet is a quality attribute for a house, and years of experience is a quality attribute for a computer programmer. Two automobiles of the same make and model may be differentiated by their age. Quality attributes provide further details about an item of a product. An item of a product may have a quantifiable quality attribute, i.e. a quality attribute which can be numerically measured and compared to quality attributes of other items of the same product.

An Attribute Filter 22 searches the Relevant Classified Advertisements Database 16 for sets of characters, such as "three thousand" or "$38,000", which represent numeric values. The Attribute Filter 22 also searches the Relevant Classified Advertisements Database 16 for words or groups of words, called numerical key words, which are associated with the numeric value sets of characters, such as "years of experience" or salary. Each numerical key word defines a quality attribute of an item of a product, such as the square footage of a particular house or the salary of a programmer. Signals indicative of a set of possible numerical key words are stored in a Numerical Key Words Database 24.

Figure 2:
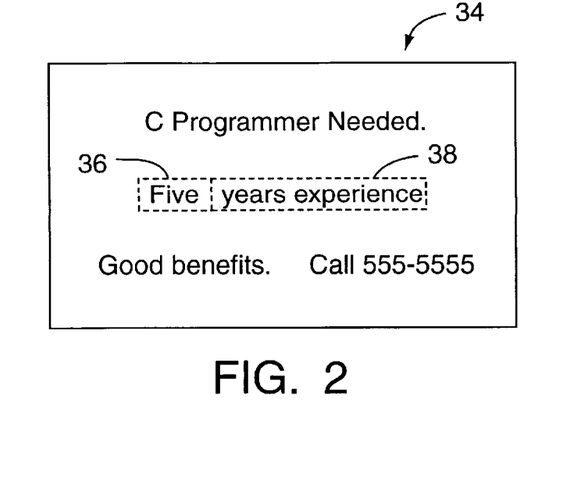
FIG. 2 depicts the text of a sample classified advertisement.

FIG. 2 depicts the text of a sample classified advertisement 34. A phrase 36 in the classified advertisement 34 represents a numeric value. Another phrase 38 is a numerical key word associated with the numeric value.

The Numerical Key Words Database 24 is in signal communication with the Attribute Filter 22. Upon finding a numeric value word or phrase in a classified advertisement, the Attribute Filter 22 searches for a word or phrase which is in the Numerical Key Words Database 24 and also within a prescribed number of words of the numeric value word or phrase. A word or phrase which is in the Numerical Key Words Database 24 and also within a prescribed number of words of the numeric value word or phrase is likely a numerical key word, and so the Attribute Filter 22 generates signals indicative of the numerical key word and the found numeric value.

In other embodiments of the present invention, the Attribute Filter 22 derives numerical key word based on the context in which a numeric value is used. For example, if a classified advertisement for "C" programmers contains the phrase "$38,000", it is reasonable to assume that the phrase is a salary amount. Thus, a numerical key word need not be explicitly named in the classified advertisement, yet can still be associated with a numeric value.

The Attribute Filter 22 stores signals indicative of the numeric value and its associated numerical key word in a Filtered Classified Advertisement Database 28. The Filtered Classified Advertisement Database 28 contains signals indicative of database entries, and each entry comprises information abstracted from the classified advertisements represented in the Relevant Classified Advertisements Database 16. In the preferred embodiment, each entry comprises the nominal key words, numerical key words and numeric value of a classified advertisement. Also in the preferred embodiment, the Attribute Filter 22 generates signals indicative of the source, date, section and page number and two types of numeric values: salary amounts and experience required.

If a classified advertisement provides a high salary amount and low salary amount as well as a high experience requirement and low experience requirement, then the classified advertisement is used to form, two entries in the Filtered Classified Advertisement Database 28. A first entry includes the high salary amount and the high experience requirement, while the second entry includes the low salary amount and the low experience requirement. For example, if a classified advertisement lists an experience requirement of between five and seven years of experience, and a salary amount of between forty thousand dollars and fifty thousand dollars, a first entry would comprise signals indicative of an experience requirement of five years and a salary amount of forty thousand dollars, while a second entry would comprise signals indicative of an experience requirement of seven years and a salary amount of fifty thousand dollars.

If a classified advertisement provides a salary amount and both a high and low experience requirement, only the high experience requirement is included in the entry in the Filtered Classified Advertisement Database 28. Similarly, if a classified advertisement provides an experience requirement and both a high and low salary amount, only the low salary amount is included in the entry in the Filtered Classified Advertisement Database 28. Thus, the entry in the Filtered Classified Advertisement Database 28 is more conservative by including a high experience requirement with a low salary amount.

It will be understood by those skilled in the art that the Filtered Classified Advertisement Database 28 and the Relevant Classified Advertisements Database 16 may be implemented by database software running on a single computing platform. The data need not be distributed across two computing platforms, though it may be in certain embodiments of the present invention.

A Sorting Module 26 receives signals indicative of the nominal key words, and signals indicative of the subset of classified advertisements in the Relevant Classified Advertisement Database 16, and thereby determines a job position, or type of job, advertised in each classified advertisement represented by an entry in the Filtered Classified Advertisement Database 28. The type of job advertised in a classified advertisement, such as a C programmer, a data base administrator or a quality assurance expert, is the "product" identified in the classified advertisement. The Sorting Module 26 generates sorting signals which are indicative of the type of job associated with each entry in the Filtered Classified Advertisement Database 28. The sorting signals are stored in the Filtered Classified Advertisement Database 28.

Each of the nominal key words is a member of one of a plurality of key word categories. Each key word category is a broad classification that encompasses a plurality of more specific classifications, namely the nominal key words. In the preferred embodiment, the key word categories are "Position", "Skills", "Operating System" and "Programming Languages". Nominal key words which are members of the "Position" category include those nominal key words which identify a position in an organization or hierarchy, such as "engineer", "programmer", "quality assurance" and "support". Nominal key words which are members of the "Skills" category include those nominal key words which identify a type of required expertise, such as "LAN", "Data Base", "Hardware Maintenance", "Desktop Publishing" and "Internet". Nominal key words which are members of the "Operating System" category include those nominal key words which identify a type of computing platform to be used in a job, such as "Unix", "IBM PC", "Windows NT", "Macintosh", "AS400", "Tandem" and "VAX". Nominal key words which are members of the "Programming Languages" category include those nominal key words which identify a computer programming language, such as "low order", "PC application programming", "mainframe production control" and "mainframe applications programming".

A given product which a classified advertisement identifies is defined by nominal key words which are provided in the classified advertisement. Specifically, a given product is defined by prescribed combinations of nominal key words in the advertisement. For example, a first classified advertisement which contains the nominal key words "programmer" and "Visual Basic" defines the product sought by the first classified advertisement to be a PC Application Programmer. Similarly, a second classified advertisement which contains the nominal key words "developer" and "graphical user interface" also defines the product sought by the second classified advertisement to be a PC Application Programmer.

Table 1 illustrates an exemplary set of nominal key words and the type of job the set describes. The table is provided as an illustration, not a limitation, of possible associations of types of jobs and sets of nominal key words.

TABLE 1

Nominal Key Words and Types of Jobs

| Type of Job | Position Category | Skills Category | Classified ad contains: |
| --- | --- | --- | --- |
| C Programmer | "programmer", "designer", "developer" | "C", "C++", "visual C+", "BAL" | a nominal key word from each of the Position and the Skills categories. |
| PC Application Programmer | "programmer", "designer", "developer" | "visual basic", "VB", "powerbuilder", "GUI", "basic", "clipper" "VSAM", "DASD" | a nominal key word from each of the Position and the Skills categories |
| Quality Assurance | "migrating", "debugging", "data security", "disaster recovery", "data integrity" |  | a nominal key word from either the Position and the Skills categories |
| Data Base Administrator | "administrator", "architect", "systems engineer" | "oracle", "sybase", "DB2", "SQL SRVR", "informix", "gupta", "adabase", natural 2", "RDBMS", "lotus notes", "dbase", "foxpro", "paradox", MS access" | a nominal key word from each of the Position and the Skills categories |
| Data Base Support | "support" | "oracle", "sybase", "DB2", "SQL SRVR", "informix", "gupta", "adabase", "natural 2", "RDBMS", "lotus notes", "dbase", "foxpro", "paradox", MS access", "data base" | a nominal key word from each of the Position and the Skills categories |
| Main Frame Application Programming | "programmer", "designer", "developer" | "cobol", "fortran", "RPG", "SAS", "stratus", "PL1", "APL" | a nominal key word from each of the Position and the Skills categories |
| Main Frame Quality Assurance | "migrating", "debugging", "data security", "disaster recovery", "data integrity" | "cobol", "fortran", "RPG", "SAS", "stratus", "PL1", "APL" | a nominal key word from each of the Position and the Skills categories |
| Main Frame Production Control | "production control", SMS", "HMS" | "JCL", "C-LIST", "REXX", "TSO/ISPF" | a nominal key word from each of the Position and the Skills categories |
| LAN Administrator | "administrator", "architect", "systems engineer" | "CNE", "LAN", "WAN", "novell netware 4.1", "CSU/DSU", "solaris", "muxecs" | a nominal key word from each of the Position and the Skills categories |
| LAN Support | "support" | "LAN", "WAN", "novell netware 4.1", "CSU/DSU", "solaris", "muxecs" | a nominal key word from each of the Position and the Skills categories |
| Help Desk | "help desk", "software installer", "MIS support", "word | "lotus 1-2-3", "MS office", "amipro", "photoshop", | a nominal key word from the Position category, |

TABLE 1-continued

Nominal Key Words and Types of Jobs

| Type of Job | Position Category | Skills Category | Classified ad contains: |
|---|---|---|---|
| | processing/spreadsheet support", "upgrading PC hardware", "hardware maintenance" | "framemaker", "pagemaker", "quark", "freelance graphics" | though a nominal key word from the Skills category as well is preferable |

As is described hereinbelow and as evidenced by Table 1, a first set of nominal key words may define a type of job which is substantially similar in price characteristics to a second set of nominal key words. Accordingly, the first and second sets are considered to define a single type of job. For example, a first set of nominal key words "cobol developer" and a second set of nominal key words "fortran programmer" both define the type of job "Main Frame Application Programming" in the sample set of associations provided in Table 1.

The Sorting Module 26 counts the number of occurrences of each set of nominal key words in the entries in the Filtered Classified Advertisement Database 28. To be statistically significant, a set of nominal key words must exist in at least thirty-five entries, though more are preferable. In one embodiment, any set of nominal key words which exist in at least thirty-five entries is considered a set which defines a product. However, as described hereinbelow, it is advantageous to consider sets which define products with similar price characteristics as defining a single product.

For example, it is often, but not always, true that the existence of a nominal key word which is a member of the "Operating Systems" category has little or no effect on the price characteristics of a type of job. In other words, the type of operating system used is immaterial in determining the salary amount of a type of job. If a set of nominal key words occurs at least thirty-five times in the Filtered Classified Advertisement Database, the Sorting Module must determine if the type of operating system described in the set of nominal key words is significant in determining price characteristics of the type of job identified by the set of nominal key words. If the type of operating system described in the set of nominal key words is not significant in determining price characteristics of the type of job, then a plurality of sets of nominal key words will have the same price characteristics. A method for determining whether sets of nominal key words have the same price characteristics is described hereinbelow.

Once the Sorting Module 26 determines which entries in the Filtered Classified Advertisement Database 28 are associated with each product, i.e. type of job, a Price Analyzer 30 determines the price characteristics of each product. In the preferred embodiment, the price characteristics of a product comprise the average market price and the degree of variation around the average market price.

Certain classified advertisements which identify a product do not contain any numerical key words which are indicative of a quality attribute. For example, a classified advertisement may simply identify a product by name and a price for the product. For a product which does not have a quality attribute, the Price Analyzer 30 determines the average market price of the product and the variation of the average market price in dependence on the entries which identify the product, and generates, in dependence on signals received from the Filtered Classified Advertisement Database 28, signals indicative of the average market price of the product and signals indicative of the variation of the average market price.

It is assumed that the prices are "normally distributed". Those skilled in the art are well aware of the definitions of such statistical terms as average, variation, standard error and normal distribution, and these definitions and methods of calculation may be found in "Introduction to Theory and Practice of Econometrics", by George Judge, R. Carter Hill, William Griffiths, Helmut Luitkepohl and Tsoung-Chao Lee. As is also known in the art, the normal distribution assumption is justified when the number of entries is large, such as thirty-five or more entries. Statistical functions which the Price Analyzer performs may be implemented by commercially available statistical processing software, such as Statview 4.51 by Abacus Concept, Inc.

Figure 6:
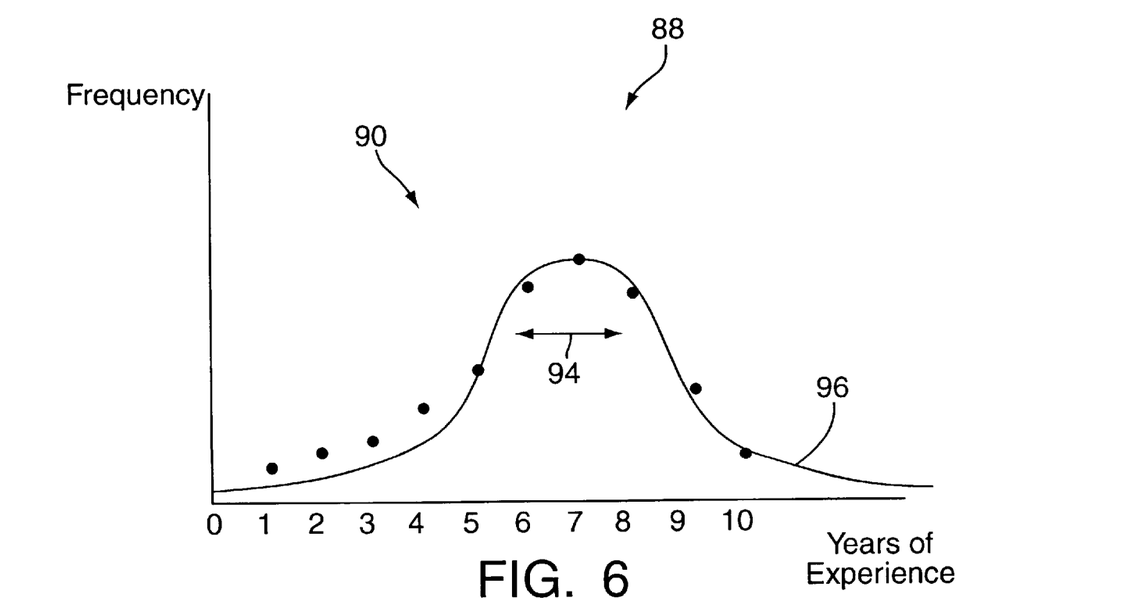
FIG. 6 shows a graph having a curve indicative of a normal distribution of points.

FIG. 6 shows a graph 88 having a curve 96 indicative of a normal distribution of points 90. Each of the points 90 represent a frequency, or number of occurrences, of a number of years of experience. The years of experience represented by the points 90 furthermore have a standard deviation, indicated by reference numeral 94.

For a product which does have a quality attribute, the Price Analyzer 30 furthermore performs a regression analysis to determine the market price of the product for different values of the quality attribute, thereby defining a regression equation for each product with a quality attribute. Regression Analysis is described in "Introduction to Theory and. Practice of Econometrics", supra at pp. 109–158. The regression equation provides a one-to-one correspondence between a quality attribute, such as number of years of experience or real estate square footage, and a price, such as an average salary amount or real estate cost. Regression analysis is described in more detail hereinbelow. Of course, it is understood by those skilled in the art that the generation of a regression equation is a step in transforming signals indicative of classified advertisements and in generating signals indicative of price characteristics in graphical form. It is further understood by those skilled in the art that more than one quality attribute may be may be used. Multiple-regression analysis techniques for prices which depend on more than a single quality attribute are equally known in the art.

Together, the regression analysis and the distribution analysis describe the average price of a product and a probability range that a price is within a prescribed range of the average price.

Figure 3:
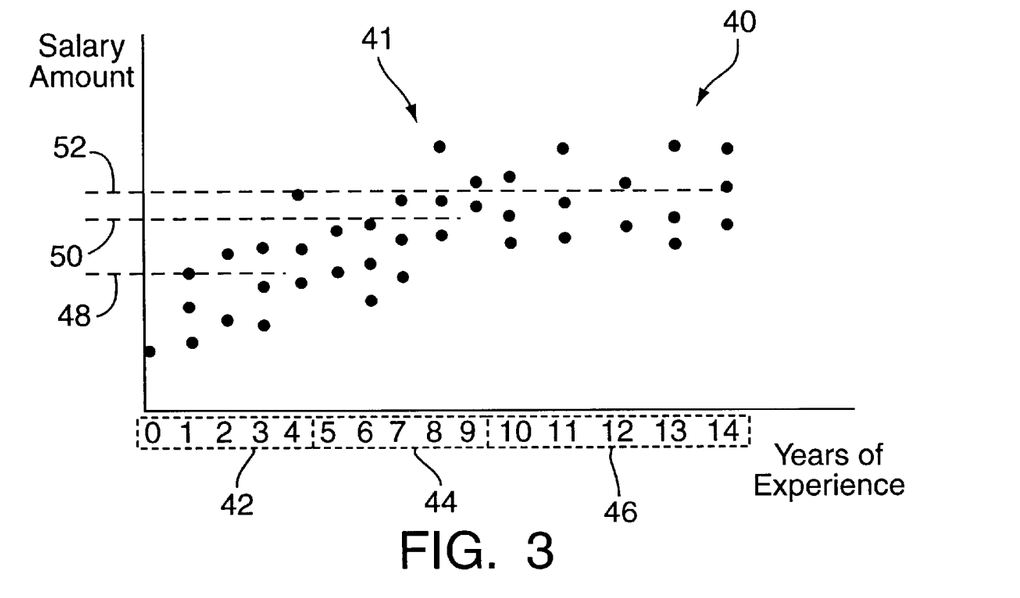
FIG. 3 shows a chart having points which represent entries derived from classified advertisements.

The Price Analyzer 30 performs a distribution analysis, comprising determining the average price and the standard deviation of the average price for entries which have prescribed ranges of numeric values of a quality attribute. For example, as shown in a chart 40 in FIG. 3, for a given type of job, there are points 41 which represent entries whose "years of experience" values range from zero years to fourteen years. A first prescribed range 42 of numeric values, zero to four years, has a first average salary 48 and standard deviation of the first average salary. Similarly, a second prescribed range 44 of numeric values, five to nine years, also has a second average salary 50 and standard deviation of the second average salary. A third prescribed range 46 of numeric values, ten to fourteen years, has a third average salary 52 and standard deviation of the third average salary.

For each product, it is preferred that the Price Analyzer 30 performs a distribution analysis on between two and six ranges of numeric values. In the preferred embodiment, the Price Analyzer 30 determines the number of ranges of numeric values for a product in the following manner: the Price Analyzer 30 calculates the average number of years of experience and the standard deviation of the average number of years of experience of all entries for all products. A first range of numeric values, i.e. years of experience, is defined as those numeric values which are within one standard deviation of the average. A second range of numeric values is defined as those numeric values which are between one standard deviation above the average and two standard deviations above the average. A third range of numeric values is defined as those numeric values which are between one standard deviation below the average and two standard deviations below the average. A fourth range of numeric values is defined as those numeric values which are between two standard deviations above the average and three standard deviations above the average. A fifth range of numeric values is defined as those numeric values which are between two standard deviations below the average and three standard deviations below the average. These range for the years of experience are applied in the calculations for all types of jobs.

The Price Analyzer 30 calculates descriptive statistics for various groups of entries in the Filtered Classified Advertisement Database 28. Descriptive statistics as used herein is defined as the following values: average price, standard deviation of the price, standard error of the average price, 95% probability range of the average price, 68% probability range of the price, and 95% probability range of the price. A method of calculating these values is described in "Introduction to Theory and Practice of Econometrics", supra at pp. 187–188, and is generally known in the statistical arts.

For each type of job, the Price Analyzer calculates the descriptive statistics for all entries associated with the job. In addition, far each type of job the Price Analyzer calculates the descriptive statistics for entries in which the number of years of experience is within each prescribed range of numeric values.

Table 2 below shows a method according to the present invention of calculating price information, the method presented in pseudocode form.

TABLE 2

Calculation of Price Information

Calculate average price for entries which define all products
Calculate variation of the average price for entries which define all products
For all products
   calculate the average price of the product
   calculate the standard deviation of the price of the product
   calculate the standard error of the average price of the product
   calculate 95% probability range of the average price
   calculate 68% probability range of the price
   calculate 95% probability range of the price
   If the product has a quality attribute, then
     for each of a number of ranges of the quality attribute
       calculate the average price of the product
       calculate the standard deviation of the price of the product
       calculate the standard error of the average price of the product
       calculate 95% probability range of the average price
       calculate 68% probability range of the price
       calculate 95% probability range of the price
     end for each of a number of ranges
   end if
end for all products The Price Analyzer 30 performs a regression analysis on each set of entries which define a type of job. In addition, it is helpful to perform a regression analysis on combinations of such sets, as well as subsets of such sets. Performing regression analyses on combinations of such sets, as well as subsets of such sets allows the Price Analyzer 30 to compare the price characteristics of various types of jobs, as well as the price characteristics of different variations of a single type of job.

In performing regression analysis, the Price Analyzer 30 generates signals indicative of a regression equation of a dependent variable, i.e. salary amount, as a function of an independent variable, i.e. years of experience. A value of the dependent variable is the average, or expected value, given a value of an independent variable.

The regression equation is a linear expression of the variables or a linear expression of transformations of the variables. Thus, the regression equation is typically in linear, log-linear, or Taylor expansion form. In the preferred embodiment, the regression equation is one of four forms of linear equations:

| | |
|---|---|
| $y = a + b*x$ | linear |
| $\ln(y) = a + b*\ln(x)$ | logarithmic in x and y |
| $y = a + b*\ln(x + 1)$ | linear in y, logarithmic in x |
| $y = a + b*x + c*x^2$ | second order Taylor expansion | where:
   ln ( ) is the natural logarithm operation on the term in parentheses
   y is salary amount,
   x is years of experience,
   a is a constant referred to as the intercept
   b is a constant referred to as the linear regressor
   c is a constant
   a, b, and c are determined by the regression analysis The Price Analyzer determines the best equation form by applying $R^2$, F and t statistics to each equation form. $R^2$, F and t statistics are well known in the statistical arts, and are described in "Introduction to Theory and Practice of Econometrics", supra at pp. 145–148, 190–192 and 199–202 respectively. An equation form has an acceptable F statistic if the F statistic indicates that there is less than a prescribed minimum probability that the salary amount and years of experience values do not have the equation form. In the preferred embodiment, there is less than a one in ten-thousandth (0.01%) chance that the salary amount and years of experience values do not have the equation form. An equation form has an acceptable t statistic if the t statistic indicates that there is less than a prescribed minimum probability that there is no relationship between salary amount and years of experience. In the preferred embodiment, there is less than a one in ten-thousandth (0.01%) chance that there is no relationship between salary amount and years of experience. Of the equation forms that have both an acceptable F statistic and an acceptable t statistic, the Price Analyzer 30 selects the equation form with the highest $R^2$ statistic.

Usually, either the linear form or the logarithmic in x and linear in y form are determined to be the best equation form. Accordingly, the description of the regression equation provided hereinbelow explicitly refers to the constants a and b, but not c. However, the price Analyzer 30 can calculate a regression equation using forms other than those equation forms described herein without departing from the scope of the present invention.

The Price Analyzer 30 generates regression analysis signals which comprise signals indicative of an average intercept, signals indicative of an average linear regressor, signals indicative of a 95% probability range for the intercept, and signals indicative of a 95% probability range for the linear regressor. The signals indicative of a 95% probability range of a variable comprise signals indicative of a 95% probability range upper bound of the variable and signals indicative of a 95% probability range lower bound of the variable. Thus, the regression analysis signals comprise signals indicative of an average intercept, signals indicative of an average linear regressor, signals indicative of an upper bound of the intercept, a lower bound of the intercept, an upper bound of the linear regressor and a lower bound of the linear regressor. A method of calculating the 95% probability range of a variable is described in "Introduction to Theory and Practice of Econometrics", supra at pp. 187–188. In general, however, it is known to those skilled in the art that the 95% probability range for a variable is calculated by considering the variable, an estimate of the variance of the variable and the t distribution The estimate of the variance of the variable is multiplied by the t distribution coefficient, yielding a scaled variance. An upper and lower bound are calculated by added the scaled variance the variable and subtracted the scaled variance from the variable, respectively. It is also known in the art that the t distribution provides the upper and lower 47.5% probability coefficient, and the estimate of the variance is derived from a matrix equation of residuals and a data matrix of the independent variables.

The Price Analyzer 30 generates, in dependence on the regression analysis signals, signals indicative of a first regression equation in which the value of the constant 'a' is the average intercept and the value of the constant 'b' is the average linear regressor. In the preferred embodiment, the Price Analyzer also generates, in dependence on the regression analysis signals, signals indicative of two additional regression equations. In a second regression equation, the value of the constant 'a' is the lower bound of the intercept and the value of the constant 'b' is the upper bound of the linear regressor. In a third regression equation, the value of the constant 'a' is the upper bound of the intercept and the value of the constant 'b' is the lower bound of the linear regressor.

Each of the three regression equations is a linear equation of a dependent variable, i.e. salary amount, as a function of an independent variable, i.e. years of experience. It is preferred that, for each of the three regression equations, the Price Analyzer calculates the dependent variable value, i.e. salary amount, for each of the integer values of the independent variable, i.e. years of experience, from 0 to 10. Thus, for each regression equation, the Price Analyzer calculates eleven salary amounts. The salary amounts which result from the calculations involving the first regression equation are the expected salary amounts, the salary amounts which result from the calculations involving the second and third regression equations are boundaries around the salary amounts.

Figure 4:
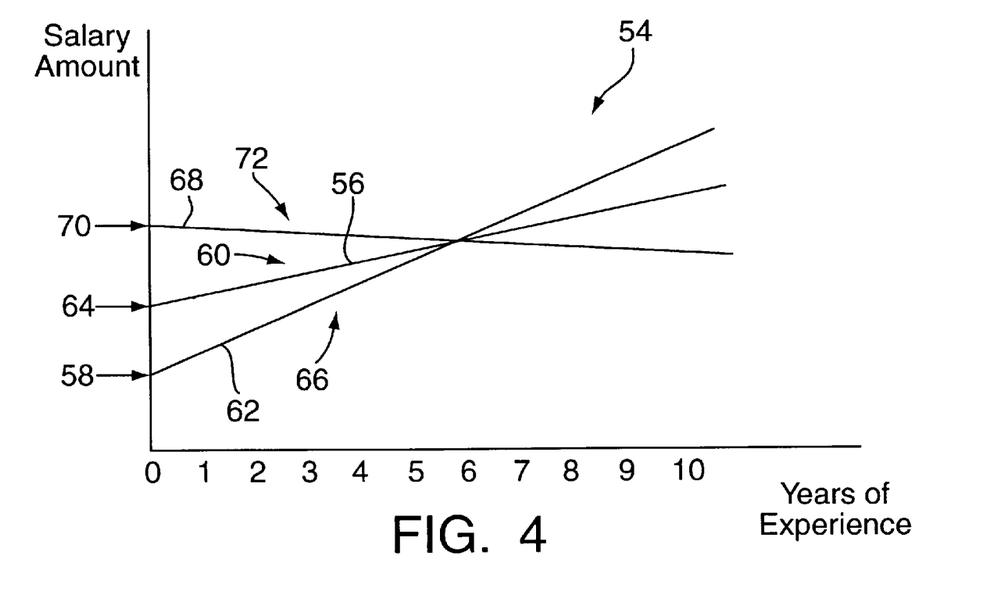
FIG. 4 shows a graph of points for three regression equations.

FIG. 4 shows a graph 54 of points for the three regression equations. A first line 56, representative of a first regression equation, has a Y-intercept value 64 equal to the average intercept which the Price Analyzer 30 calculates. The first line also has a slope, indicated by reference numeral 60, which is equal to the average linear regressor which the Price Analyzer 30 calculates. A second line 62, representative of a second regression equation, has a Y-intercept value 58 equal to the lower bound of the intercept which the Price Analyzer 30 calculates. The second line also has a slope, indicated by reference numeral 66, which is equal to the upper bound linear regressor which the Price Analyzer 30 calculates.

A third line 68, representative of a third regression equation, has a Y-intercept value 70 equal to the upper bound of the intercept which the Price Analyzer 30 calculates. The third line also has a slope, indicated by reference numeral 72, which is equal to the lower bound linear regressor which the Price Analyzer 30 calculates.

It is advantageous to perform regression analyses on each type of job to see if the resulting regression equations are substantially different from the regression equation resulting from a regression analysis of the entire set of entries in the Filtered Classified Advertisement Database 28. It is also advantageous to perform regression analyses in order to compare the resulting regression equations of different types of jobs to see if different types of jobs have significantly different price characteristics or can be considered to be a single type of job in terms of price characteristics. For example, in two types of jobs which differ only in the type of operating system used, the operating system used may not make a difference in the salary amounts.

To test for significant differences in the price characteristics of two sets of entries, such as two different types of jobs or a type of job and all entries, the Price Analyzer 30 compares the 95% probability ranges of the intercepts of both sets of entries, and compares the 95% probability ranges of the linear regressor of both sets of entries. If there is overlap between the 95% probability ranges of the intercepts of both sets of entries, or between the 95% probability ranges of the linear regressors of both sets of entries, then there is no statistically significant difference between the price characteristics of the two sets of entries.

For each set of signals indicative of a regression equation, the Price Analyzer 30 generates signals indicative of residuals. A residual is a value indicative of a difference between an actual salary amount provided in an entry having an associated value for years of experience, and a dependent variable value calculated from the regression equation at a prescribed dependent variable value which is equal to the value for years of experience of the entry. In graphical form, a residual represents a distance in the direction of the Y-axis from a point representing an actual salary amount to a line representing a regression equation.

Figure 5:
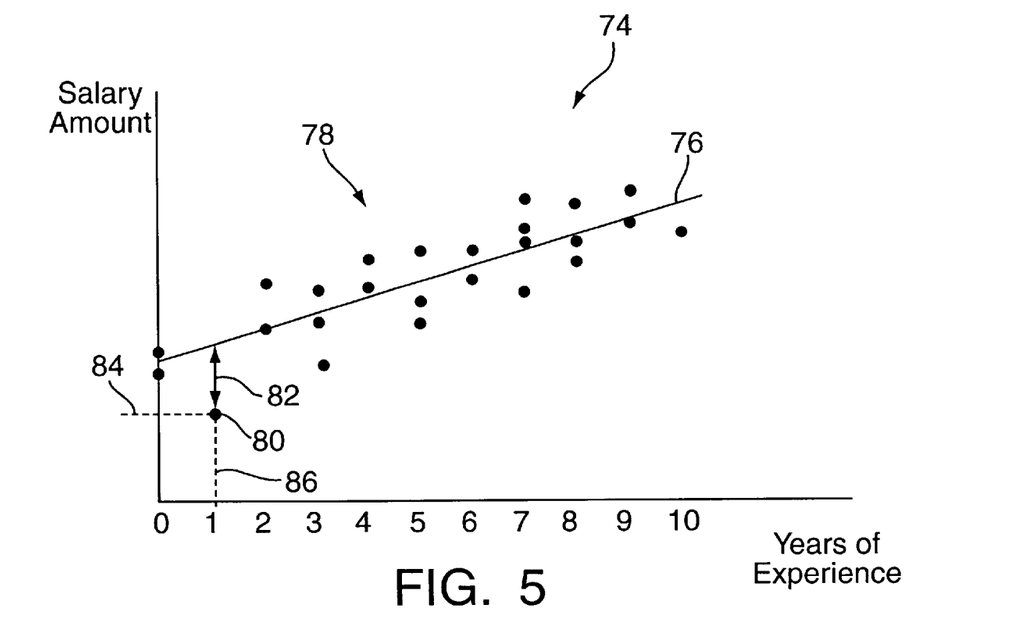
FIG. 5 shows a graph having a line indicative of a regression equation and a set of points indicative of entries.

FIG. 5 shows a graph 74 having a line 76, indicative of a regression equation, and a set of points 78, indicative of entries. As described hereinabove, an entry defines a salary amount and a number of years of experience. Though the regression equation represented by line 76 is an idealized relationship between years of experience and salary, the points 78 do not all lie on the line 76. A point 80, which represents a number of years of experience 86 and a salary amount 84, is a distance 82 below the line 76. Accordingly, a residual associated with the value 84 has the value equal to the distance 82, and is associated with the number of years of experience 86.

Ideally, the value of a residual is not correlated with the number of years of experience 86 associated with the residual. The Price Analyzer 30 ascertains whether there exists a relationship between the residuals and the years of experience associated with each residual. The existence of a relationship between the residuals and the years of experience associated with each residual is called heteroscedasticity. One such relationship is that the residuals increase as the years of experience associated with the residuals increase. If there exists a relationship, then the relationship is information which ideally should be incorporated into the regression equation.

Since the residuals have a pattern, the Price Analyzer 30 adjusts for the pattern and calculates an improved, statistically-sound regression equation in which the residuals are randomly distributed rather than dependent on the years of experience associated with each residual.

Such methods for adjusting are known in the art, and a method of adjusting for the pattern in residuals is presented in Table 3 in pseudocode form. The variable x below represents the dependent variable years of experience.

TABLE 3

Heteroscedasticity Adjustment

Calculate a regression equation
Generate a set of residuals R[x]
Generate a set of natural logarithms of the residuals $\ln(R^2[x])$
Calculate a regression equation with $\ln(R^2[x])$ as the dependent
    variable and the years of experience as the independent variable
Apply different equation forms to find the best regression equation
    of the two equation forms:
        $y = a + b*\ln(x); y = a + b*x^2$
Given the regression equation selected above, calculate $$\sqrt{e^{a+b*\ln(x)}} \; ; \; \sqrt{e^{a+b*x^2}}$$

Divide the salary by the square root expression above for each
    value of x
    Divide the years of experience values by the square root expression
    above for each value of x
Calculate the reciprocal of the square root expression above for
    each value of x
    Perform another regression analysis, using the set of reciprocals
    to generate an intercept in a multiple regression, between salary
    amount and years of experience. Run all of the tests of functional
    form
    and subsections of the data as before.

In the preferred embodiment, the Price Analyzer 30 also generates signals indicative of an upward mobility equation in dependence on signals indicative of the regression equations of two types of jobs. An upward mobility equation describes a difference between a low-paying type of job and a high-paying type of job. Specifically, an upward mobility equation is a function which describes the years of experience required for the high-paying type of job as a function of the experience requirement of the low-paying type of job. In other words, given a first number of years of experience in the low-paying type of job, the upward mobility equation provides a second number of years of experience required in the high-paying job to make the same salary amount as is made in the low-paying job at the first number of years of experience.

For example, given a first regression equation for a first type of job which is a low-paying type of job:

$$y_1 = 30000 + 2000 * x_1$$

where:
    $y_1$ is salary amount in the first type of job
    $x_1$ is years of experience in the first type of job
and a second regression equation for a second type of job which is a high-paying type of job:

$$y906 \;_2 = 40000 + 4000 * x_2$$

where:
    $y_2$ is salary amount in the second type of job
    $x_2$ is years of experience in the second type of job
For 9 number of years in the first type of job, the salary amount is:

$$y_1 = 30000 + 2000 * 9 = 48000$$

Only 2 years of experience are necessary to make the same salary amount in the first type of job, since $$48000 = 40000 + 4000 * 2$$

Thus, the upward mobility equation for these two types of jobs provides a result of 2 years of experience in the second type of job for 9 years of experience in the first type of job.

In general, given a first regression equation for a first type of job which is a low-paying type of job:

$$y_1 = f_1(x_1)$$

and a second regression equation for a second type of job which is a high-paying type of job:

$$y_2 = f_2(x_2)$$

the upward mobility equation is:

$$x_2 = f_2^{-1}(f_1(x_1))$$

where:
    $f_2^{-1}(\;)$ is the inverse of the function $f_2(\;)$
Developing a general purpose expression of the inverse of the linear regression equation for the high-paying job is well known in the art.

In the above example, $$f_1(x_1) = 30000 + 2000 * x_1$$

$$f_2(x_2) = 40000 + 4000 * x_2$$

and $$f_2^{-1}(y) = y/4000 - 10$$

Thus:

$$f_2^{-1}(f_1(x_1)) = x_1/2 - 2.5$$

And, as expected, when $x_1 = 9$ years of experience, $f_2^{-1}(f_1(x_1)) = 2$ years of experience.

A Graphing Module 32 receives from the Price Analyzer 30 the signals indicative of regression equations and the signals indicative of upward mobility equations, and generates, in dependence thereupon, a first set of graphical display signals for visual presentation of price estimation of a product for different amounts of quality attributes. In the preferred embodiment, the first set of graphical display signals are for visual presentation of salary amounts for a type of job for different amounts of years of experience. The Graphing Module may be any of a number of commercially available graphical packages, such as Delta Graph 4.0 by Delta Point, Inc.

The Graphing Module furthermore receives from the Price Analyzer the signals indicative of the average market price of the product and signals indicative of the variation of the average market price, and generates, in dependence thereupon, a second set of graphical display signals for visual presentation of price estimation of a product that does not have a quality attribute. In the preferred embodiment, the second sew of graphical display signals are for visual presentation of the average salary amount and the variation of the average salary amount for a type of job.

The sets of graphical display signals are typically indicative of a conventional X-Y graph in which salary amounts are indicated by a position along the Y-axis direction and years of experience are indicated by a position along the X-axis direction. The set of graphical display signals which are generated in dependence on the upward mobility equations are typically indicative of a conventional X-Y graph in which years of experience in a first type of job are indicated by a position along the Y-axis direction and years of experience in a second type of job are indicated by a position along the X-axis direction. Other graphical display methods are known in the art and may be used without departing from the scope of the present invention. For example, text displays which described the information displayed on a graph are preferable, as are displays which comprise text only.

In the preferred embodiment, the present invention is implemented as a computing platform which is in signal communication with a world-wide network of computing platforms, such as the World Wide Web (WWW). Thus, the graphical display signals can be transmitted via the world-wide network to computers which are at locations remote from a computer on which other components of the present invention reside. In such an embodiment, the graphical display signals are indicative of formats which the remote computer accepts, such as a conventional portable document format (PDF) by Adobe, Inc.

Figure 7:
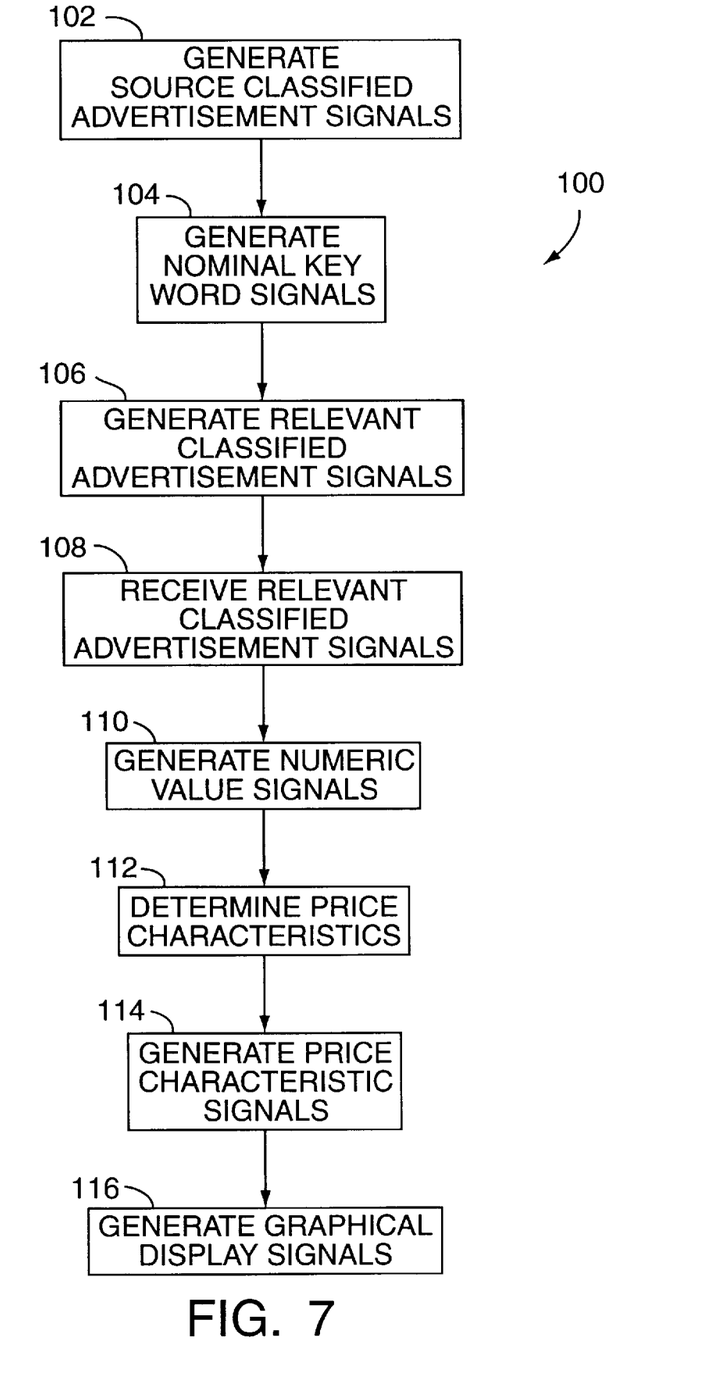
FIG. 7 shows a flow chart of a process implemented by the price estimation system provided in accordance with the present invention.

The flow chart 100 of FIG. 7 summarizes the process steps implemented by the system of the present invention. As shown by step 102, in the preferred embodiment source classified advertisement signals are generated, typically by a database such as the source database 12 (FIG. 1). Also in the preferred embodiment, nominal key word signals are generated, as shown by step 104, and relevant classified advertisement signals are generated, as shown by step 106. By receiving the relevant classified advertisement signals, as shown by step 108, and generating numeric value signals, as shown by step 110, the price characteristics of a product can be determined, as shown by step 112. Thus, price characteristic signals indicative of the price characteristics can be generated, as shown by step 114. Finally, graphical display signals presenting the price characteristics are generated, as shown by step 116.

Although the invention has been shown and described with respect to a preferred embodiment thereof, it would be understood by those skilled in the art that other various changes, omissions and additions thereto may be made without departing from the spirit and scope of the present invention. For example, although in the preferred embodiment the years of experience and the salary amount were described, a number of other quality attributes may be used, depending on the product. Also, though regression analysis involving one quality attribute has been described, the present invention is equally applicable to products having multiple quality attributes.

What is claimed is:

1. A system for estimating price characteristics of a product from classified advertisements by selecting and extracting information from the classified advertisements, comprising:

a source database of classified advertisement signals in the form of a plurality of character signals, the classified advertisement signals being representative of true market values of the product;

acquisition and filtering means for receiving the plurality of character signals and generating and storing relevant classified advertisement signals corresponding to the product and consisting of subsets of the classified advertisement signals in the form of characters;

attribute filter means for receiving the relevant classified advertisement signals and generating and storing filtered classified advertisement signals that include at least one quality signal and at least one quantity signal for each relevant classified advertisement signal;

price analyzer means for receiving the filtered classified advertisement signals, and generating price characteristic signals for the product using the quality signals and the quantity signals; and graphing means for receiving the price characteristic signals and generating graphical display signals corresponding to the price characteristic signals of the product.

2. The system for estimating price characteristics of a product from classified advertisements, as defined in claim 1, wherein the acquisition and filtering means further comprises:

a nominal key words database for storing nominal key word signals that correspond to the product and consist of sets of characters;

selecting relevant classified advertisement signals by substantially matching the classified advertisement character signals with the nominal key word signals; and a relevant classified advertisements database for storing relevant classified advertisement signals that consist of the sets of characters.

3. A system for estimating price characteristics of a product from classified advertisements, as defined in claim 1, wherein the attribute filter means further comprises:

a numerical key words database for storing numerical key word signals that define quality signals and quantity signals corresponding to the product and consist of sets of characters;

means for generating filtered classified advertisement signals by substantially matching relevant classified advertisement character signals with the quality signals and with the quantity signals that consist of sets of characters; and filtered classified advertisement database for storing filtered classified advertisement signals.

4. A system for estimating price characteristics of a product from classified advertisements, as defined in claim 3, wherein generating filtered classified advertisement signals further comprises:

means for matching the relevant classified advertisement character signals with the corresponding quantity signals that consist of sets of characters to provide numeric value signals that are in numerical form; and means for matching the relevant classified advertisement character signals with the corresponding quality attribute signals that consist of sets of characters to provide quality attribute signals.

5. A system for estimating price characteristics of a product from classified advertisements by selecting and extracting information from classified advertisements, comprising:

a source database containing classified advertisements represented by a plurality of characters, the classified advertisements being representative of true market values of the product;

acquisition and filtering means including:

means for matching classified advertisements characters with nominal key words, and generating relevant classified advertisements, wherein each nominal key word consists of at least one character representative of classified advertisements;

means for storing the relevant classified advertisements as characters; attribute filter means comprising:

means for selecting at least one quality attribute from each of the relevant classified advertisements by substantially matching relevant classified advertisement characters with numerical key words, wherein each numerical key word consists of at least one character;

means for selecting at least one numeric value word from each of the relevant classified advertisements by substantially matching relevant classified advertisement characters with numerical key words, and generating an associated numeric value;

means for storing the selected quality attributes, the selected numeric key words and the associated numeric values as filtered classified advertisements;

price analyzer means for receiving the filtered classified advertisement signals, and generating price characteristic signals of the product; and means for graphing the price characteristic signals and generating graphical display signals corresponding to the price characteristic signals of the product.

6. A system for estimating price characteristics of a product from classified advertisements by selecting and extracting information from the classified advertisements, as defined in claim 5, further comprising:

means for storing numerical key words and nominal key words in at least one database.

7. A system for estimating price characteristics of a product from classified advertisements by selecting and extracting information from the classified advertisements, as defined in claim 5, further comprising:

a relevant classified advertisements database for storing relevant classified advertisements; and a filtered classified advertisements database for storing filtered classified advertisements.

8. A system for estimating price characteristics of a product from classified advertisements by selecting and extracting information from the classified advertisements, as defined in claim 5, wherein the product is a specified job, and the numeric values include salary ranges for the job and the specified years of experience for the job.

9. A system for estimating price characteristics of a product from classified advertisements by selecting and extracting information from the classified advertisements, as defined in claim 8, wherein the graphing means further comprises generating graphs that include salary ranges for the specified job against the specified years of experience for the specified job.

10. A system for estimating price characteristics of a product from classified advertisements by selecting and extracting information from the classified advertisements, as defined in claim 8, wherein the graphing means generates graphs that include an average salary range for the specified job against a variation of the average salary range for the job.

11. A system for estimating price characteristics of a product from classified advertisements by selecting and extracting information from the classified advertisements, as defined in claim 8, wherein the price analyzer means further includes generating at least one upward mobility equation that describes a number of years of experience required for the type of job as a function of a number of years of experience required for a second type of job.

12. A system for estimating price characteristics of a product from classified advertisements by selecting and extracting information from the classified advertisements, as defined in claim 5, wherein the price analyzer means further comprises generating price characteristics of a product by regression analysis using the numeric values.

13. A method for estimating price characteristics of a product from classified advertisements by selecting and extracting information from the classified advertisements, comprising:

selecting a source of classified advertisements representative of true market values of the product;

selecting relevant classified advertisements corresponding to the product from the source of classified advertisements;

selecting and generating quality attributes and quantity attributes and associated numeric values corresponding to the product from the relevant classified advertisements;

generating price characteristics of the product using the numeric values corresponding to the product; and generating graphical display signals which correspond to the price characteristics of the product.

14. A method for estimating price characteristics of a product from classified advertisements by selecting and extracting information from the classified advertisements, as defined in claim 13, further comprising:

selecting relevant classified advertisements by comparing classified advertisements with nominal key words that correspond to the type of product.

15. A method for estimating price characteristics of a product from classified advertisements by selecting and extracting information from the classified advertisements, as defined in claim 13, wherein some of the numeric values correspond to salary amounts of the type of job, and some of the numeric values correspond to amounts of years of experience of the type of job.

16. A method for estimating price characteristics of a product from classified advertisements by selecting and extracting information from the classified advertisements, as defined in claim 15, wherein graphical display signals correspond to salary amounts for the type of job against years of experience for the type of job.

17. A method for estimating price characteristics of a product from classified advertisements by selecting and extracting information from the classified advertisements, as defined in claim 15, wherein graphical display signals correspond to an average salary amount of the type of job against a variation of the average salary amount of the type of job.

* * * * *

UNITED STATES PATENT AND TRADEMARK OFFICE
CERTIFICATE OF CORRECTION

PATENT NO. : 5,960,407
DATED : September 28, 1999
INVENTOR(S) : Robert G. Vivona It is certified that error appears in the above-identified patent and that said Letters Patent is hereby corrected as shown below:

Column 2, Line 22: After "survey participant", delete ",".

Column 3, Line 6: After "as expensive", delete ",".

Column 8, Line 40: After "to form", delete ",".

Column 12, Line 11: After "Helmut", delete "Luitkepohl" and insert --Lütkepohl--.

Column 14, Line 27: Delete "In" and insert --ln--.

Column 15, Line 19: After "t distribution", insert --.--.

Column 17, Line 58: Delete "$y^{906}{}_2$" and insert --$y_2$--.

Column 18, Line 57: After "second", delete "sew" and insert --set--.

UNITED STATES PATENT AND TRADEMARK OFFICE
CERTIFICATE OF CORRECTION

PATENT NO.   : 5,960,407
DATED        : September 28, 1999
INVENTOR(S)  : Robert G. Vivona It is certified that error appears in the above-identified patent and that said Letters Patent is hereby corrected as shown below:

Claim 5: Please delete claim 5 and insert the following:

5. A system for estimating price characteristics of a product from classified advertisements by selecting and extracting information from classified advertisements, comprising:
   a source database containing classified advertisements, represented by a plurality of characters, the classified advertisements signals being representive of true market values of the product;
   acquisition and filtering means including:
      means for matching classified advertisements characters with nominal key words, and generating relevant classified advertisements, wherein each nominal key word consists of at least one character representative of classified advertisements;
      means for storing the relevant classified advertisements as characters;
   attribute filter means comprising:
      means for selecting at least one quality attribute from each of the relevant classified advertisements by substantially matching relevant classified advertisement characters with numerical key words, wherein each numerical key word consists of at least one character;
      means for selecting at least one numeric value word from each of the relevant classified advertisements by substantially matching relevant classified advertisement characters with numerical key words, and generating an associated numeric value;
      means for storing the selected quality attributes, the selected numeric key words and the associated numeric values as filtered classified advertisements;

UNITED STATES PATENT AND TRADEMARK OFFICE
CERTIFICATE OF CORRECTION

PATENT NO. : 5,960,407
DATED : September 28, 1999
INVENTOR(S) : Robert G. Vivona It is certified that error appears in the above-identified patent and that said Letters Patent is hereby corrected as shown below:

price analyzer means for receiving the filtered classified advertisement signals, and generating price characteristic signals of the product; and   means for graphing the price characteristic signals and generating graphical display signals corresponding to the price characteristic signals of the product.

Signed and Sealed this

Fourth Day of July, 2000

Attest:

Q. TODD DICKINSON

Attesting Officer     Director of Patents and Trademarks